C. A. CADWELL.
METHOD OF AND APPARATUS FOR ELECTRIC WELDING.
APPLICATION FILED JUNE 2, 1917.
1,290,076.
Patented Jan. 7, 1919.
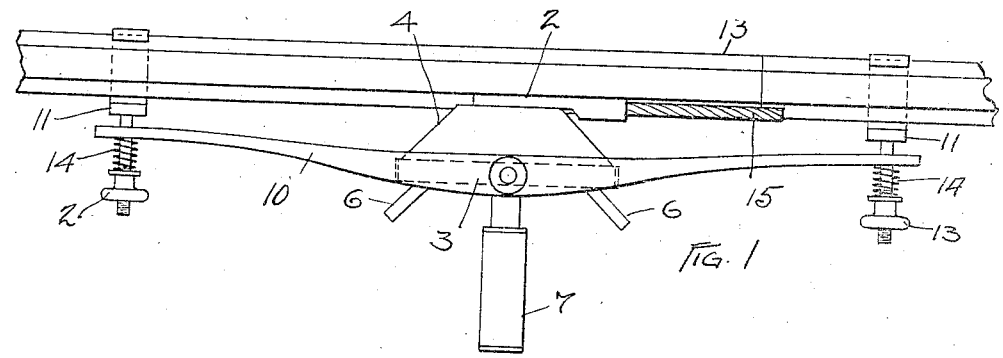
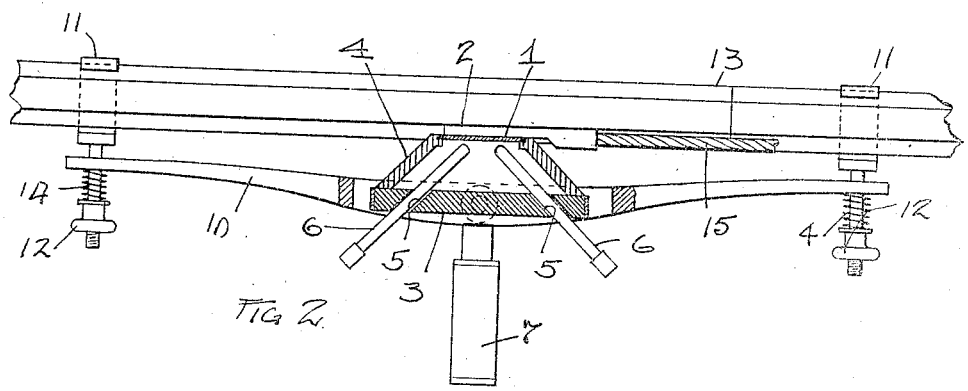
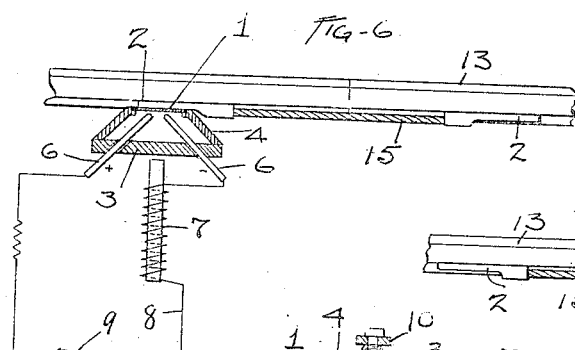
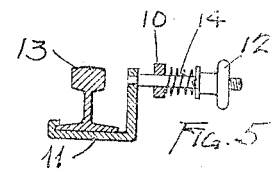
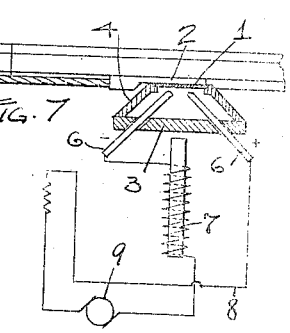
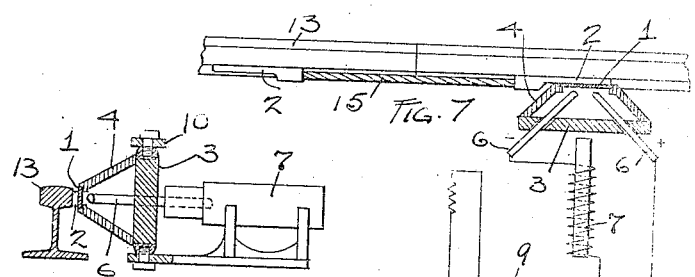
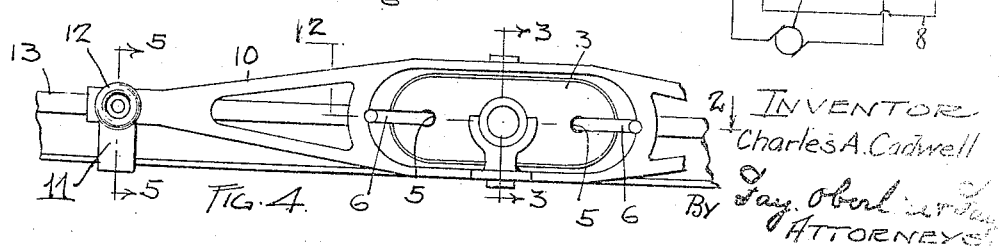
INVENTOR
Charles A. Cadwell
By Fay, Oberlin
ATTORNEYS

UNITED STATES PATENT OFFICE.

CHARLES A. CADWELL, OF CLEVELAND, OHIO, ASSIGNOR TO THE ELECTRIC RAILWAY IMPROVEMENT COMPANY, OF CLEVELAND, OHIO, A CORPORATION OF OHIO.

METHOD OF AND APPARATUS FOR ELECTRIC WELDING.

1,290,076.     Specification of Letters Patent.     Patented Jan. 7, 1919.

Application filed June 2, 1917. Serial No. 172,420.

*To all whom it may concern:*

Be it known that I, CHARLES A. CADWELL, a citizen of the United States, and a resident of Cleveland, county of Cuyahoga, and State of Ohio, have invented a new and useful Improvement in Methods of and Apparatus for Electric Welding, of which the following is a specification, the principle of the invention being herein explained and the best mode in which I have contemplated applying that principle, so as to distinguish it from other inventions.

The object of the present invention is to provide an apparatus whereby a current of relatively high voltage may be utilized in welding one metal part to another. Thus, for example, in welding, brazing, or otherwise homogeneously uniting rail bonds onto rails, current of the voltage regularly used in the operation of an electric railway may be taken from the trolley without requiring the interposition of a transformer. Heretofore, in operations of this sort, it has been found necessary to utilize an electrode of high resistance material, bringing the same to the requisite high temperature by passing therethrough a current of relatively low voltage and large amperage. In the present process, instead of relying upon the resistance of such an electrode, I utilize the electric arc which, as is well understood, will conduct a considerably higher voltage than that just indicated for such resistance electrode.

As pointed out, however, in my co-pending application filed June 19, 1915, Serial No. 35,081, considerable difficulty has heretofore been encountered in attempting to employ the electric arc for thus welding bodies together, particularly where the bodies are of unlike mass, and where, in addition, there exists a disparity in the temperature of fusion, the smaller mass, for example, having both the lower temperature fusion and the greater heat conductivity. In such a case, an ordinary arc, as is well understood, will fuse or burn such smaller body before the contacting face of the larger body is brought to a welding temperature; and, if the parts are welded together at all, they are thus united only at a few points instead of throughout their contacting surfaces, as is desirable particularly in a rail bonding operation, where the object is to provide an adequate as well as a permanent electrical connection across the joint between the two rails.

As in the aforesaid co-pending application, I utilize in the present improved process an apparatus consisting of the combination with a heat distributing plate, adapted to contact with the article to be heated, of means for directing an arc against, and spreading such arc over the surface of such plate, said means including an electro-magnetic coil suitably disposed with respect to the arc. In the present case, however, instead of utilizing one of the articles being heated, specifically the rail, as a part of the return circuit, and thus requiring but a single electrode proper, I employ two electrodes, since I have found that by a proper disposition of these with respect to the parts being welded, it is possible to secure satisfactory results.

The steps and means constituting the invention will be hereinafter fully described, and particularly pointed out in the claims the annexed drawing and following description setting forth in detail certain steps and apparatus embodying the invention, which, however, constitute but one of the various ways in which the principle of the invention may be used.

In said annexed drawing:—

Figure 1 is a plan view of an apparatus suitable for carrying out my present improved process or method; Fig. 2 is a horizontal sectional view of the same; Figs. 3 and 4 are respectively side and front elevations thereof; Fig. 5 is a vertical transverse section taken on the plane indicated by the line 5—5, Fig. 4; Fig. 6 is a view more or less diagrammatic in character illustrating one operative disposition of the apparatus; and Fig. 7 is a similar view illustrating another disposition thereof.

Where, instead of employing a single electrode, and utilizing the rail or farthermost of the two bodies to be welded together as a part of the return circuit, it is attempted to employ two electrodes, so as to set up an arc between the same which is caused by means of a magnetic field or otherwise, to laterally play against the nearest of such bodies, (of a heat distributing plate in contact therewith), a serious difficulty is encountered in that the portion of the body, or such plate, opposite the negative electrode becomes much hotter than the portion opposite the other, i. e., positive electrode, so that the first-mentioned portion of such article or plate becomes more highly heated than the other portion thereof. The result is that it has been found very difficult, if not practically impossible, to effect a uniform weld, or homogeneous juncture, of the contacting surfaces of the two bodies over a sufficient area to satisfy the requirements of rail bonding.

I have found, however, that in the case of a rail bond, where it is the terminal only that is being welded, and where the body of the bond lies to one side or the other of such terminal, heat is conducted much more rapidly away from the portion of the terminal thus contiguous to the main body of the bond than from the extreme portion of such terminal. It will be understood that these bonds are ordinarily made of copper, which has a high rate of heat conductivity, so that this may be made a factor in the process, as will now be explained.

What I accordingly do is to so locate the two electrodes between which the arc is established with reference to the portions of the rail bond terminal, thus contiguous to and farthest removed from the main body of the bond as to always have the negative electrode adjacent such first-named portion of the terminal. I have found that the wastage of heat, by conduction through the body of the bond from this portion of the terminal, will then approximately absorb the excess heat generated at the end of this electrode, and so balance the heating effect throughout the bond terminal, with the result that the latter is substantially uniformly heated throughout.

The illustrative apparatus shown in the drawings consists simply of a heat-distributing plate 1, preferably of graphite, which is adapted to contact with the article to be heated, specifically the bond terminal 2, (Figs. 3, 6 and 7) in the case in hand, in combination with a heat conserving chamber, the rear wall 3 of which consists preferably of a magnesite block or plate, while the converging side walls 4 are made of graphite or clay, old crucible stuff being well suited for the purpose. The plate 7 is removably attached either by mechanical means or a clay cement to the front edges of the side walls 4, so as to close the chamber, while the rear wall 3 is pierced by the apertures 5 inclined equally to the median line of the chamber, through which may be inserted the two electrodes 6. The latter will ordinarily consist of carbon pencils, either of cylindrical form or rectangular cross-section, as found best in the particular instance.

Suitably attached to the rear wall, between the apertures through which the electrodes are thus inserted, is an electro-magnetic coil 7 with its axis preferably lying in the median line of the device, and, as indicated in Figs. 6 and 7, the conductor 8, through which the current is supplied to the electrodes from the D. C. generator 9, forms the coil of this electro-magnet. This electro-magnet will tend to deflect the arc that is established between the two electrodes so as to increase its heating effect on the plate, and at the same time will spread such arc over the surface of the plate so as to heat a larger area than would otherwise be the case. The chamber formed by the back and side walls 3 and 4 serves, of course, to conserve the heat thus developed and prevent waste through radiation.

For supporting this chamber and appurtenant parts in proper relation to the work, any suitable means may be employed. In the case of a bonding operation such supporting means conveniently take the form of an elongated frame 10, such as shown in Figs. 1, 2, 3 and 4, to the extremities of which are attached clamps 11, that are adapted to suitably engage with the rail 13, while adjusting nuts 12 combined with compression springs 14 serve to hold the frame with the plate resting against the one bond terminal 2 under any desired degree of pressure.

In setting up the foregoing apparatus, after the frame has been secured in place in the fashion just described, the electrodes 6 are inserted through the apertures provided for the purpose in the back wall 3 of the chamber, so that their inner ends are brought to the desired degree of proximity to each other and the plate 1, the negative electrode being inserted through the aperture nearest to the body 15 of the bond, as illustrated in Fig. 6. In this way the balancing of the heating effect, to which reference has been made above, is secured. When the other terminal of the bond is to be welded, the frame 10 is shifted, of course, to properly locate the plate 1 against such other terminal, and the electrodes are removed and re-inserted in reverse position so as to still secure the desired uniform heating effect, as illustrated in Fig. 7.

Other modes of applying the principle of my invention may be employed instead of the one explained, change being made as regards the steps or mechanism herein disclosed, provided the means stated by any of the following claims or the equivalent of such stated means be employed.

I therefore particularly point out and distinctly claim as my invention:—

1. The method of electrically heating a body, one portion of which tends to heat less rapidly than another, which consists in forming an arc between two electrodes disposed adjacent to said body, the negative electrode being located nearest the portion of such body tending thus to heat less rapidly.

2. The method of electrically welding or brazing a bond terminal to a rail, the portion of such terminal contiguous to the body of the bond tending to heat less rapidly than the outer portion of such terminal, which consists in forming an arc between two electrodes disposed adjacent to said terminal, the negative electrode being located nearest the portion of such terminal tending thus to heat less rapidly.

3. In apparatus of the character described, the combination of a heat conserving chamber; a heat-distributing plate adapted to contact with the article to be heated and forming one wall of said chamber; and two electrodes extending within said chamber into proximity to said plate.

4. In apparatus of the character described, the combination of a heat conserving chamber; a heat-distributing plate adapted to contact with the article to be heated and forming one wall of said chamber; and two electrodes extending within said chamber into proximity to said plate, said electrodes being interchangeable, substantially as and for the purpose specified.

5. In apparatus of the character described, the combination of a heat conserving chamber; a heat-distributing plate adapted to contact with the article to be heated and forming one wall of said chamber; two convergent electrodes extending within said chamber into proximity to said plate; and an electro-magnetic coil disposed with its axis on a line between said electrodes.

6. In apparatus of the character described, the combination of a heat conserving chamber; a heat-distributing plate adapted to contact with the article to be heated and forming one wall of said chamber; two convergent electrodes extending within said chamber into proximity to said plate; an electro-magnetic coil disposed with its axis on a line between said electrodes; and current supply connections for said electrodes, said coil being included in series therein.

Signed by me this 25th day of May, 1917.

CHARLES A. CADWELL.